US012738561B2

(12) United States Patent
Kim et al.

(10) Patent No.: US 12,738,561 B2
(45) Date of Patent: Sep. 15, 2026

(54) CARTRIDGE FOR SECONDARY BATTERY, BATTERY MODULE, AND CARTRIDGE MODULE

(71) Applicant: SK On Co., Ltd., Seoul (KR)

(72) Inventors: Ji San Kim, Daejeon (KR); Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 751 days.

(21) Appl. No.: 18/299,064

(22) Filed: Apr. 12, 2023

(65) Prior Publication Data

US 2024/0170760 A1 May 23, 2024

(30) Foreign Application Priority Data

Nov. 21, 2022 (KR) ........................ 10-2022-0156777

(51) Int. Cl.

*H01M 10/6554* (2014.01)
*H01M 10/04* (2006.01)
*H01M 10/613* (2014.01)
*H01M 10/625* (2014.01)
*H01M 50/204* (2021.01)
*H01M 50/262* (2021.01)

(52) U.S. Cl.

CPC ... *H01M 10/6554* (2015.04); *H01M 10/0481* (2013.01); *H01M 10/613* (2015.04); *H01M 10/625* (2015.04); *H01M 50/204* (2021.01); *H01M 50/262* (2021.01); *H01M 2220/20* (2013.01)

(58) Field of Classification Search

CPC .................................................. H01M 50/202
See application file for complete search history.

(56) References Cited

U.S. PATENT DOCUMENTS

2012/0231318 A1* 9/2012 Buck .................. H01M 10/647
429/120

FOREIGN PATENT DOCUMENTS

KR 10-2016-0104452 A 9/2016
KR 20160104452 A * 9/2016 ............ H01M 50/35
KR 10-2017-0047687 A 5/2017
KR 20170098590 A * 8/2017 .......... H01M 2/1016

OTHER PUBLICATIONS

Machine translation of KR20170098590 (Year: 2026).*

* cited by examiner

*Primary Examiner* — Maria Laios
(74) *Attorney, Agent, or Firm* — IP&T GROUP LLP

(57) ABSTRACT

A cartridge for a secondary battery in accordance with an embodiment of the present disclosure includes a cell accommodating case comprising a cooling plate and an outer frame formed along an outer edge of the cooling plate; and a coupling portion connected to the cell accommodating case and having a coupling hole through which a bolt, when inserted therethrough, passes in a direction in which the cell accommodating case is stacked, wherein the coupling portion may include a first communication hole formed in a direction different from the direction in which the bolt passes.

17 Claims, 9 Drawing Sheets

FIG. 8

CARTRIDGE FOR SECONDARY BATTERY, BATTERY MODULE, AND CARTRIDGE MODULE

CROSS-REFERENCE TO RELATED APPLICATION

The present application claims priority under 35 U.S.C. § 119(a) to Korean patent application number 10-2022-0156777 filed on Nov. 21, 2022, the entire disclosure of which is incorporated by reference herein.

BACKGROUND

1. Technical Field

Embodiments of the present disclosure relate to a cartridge for a secondary battery, a battery module, and a cartridge module.

2. Related Art

With the development of electronics, communications, and space industries, the demand for lithium secondary batteries as an energy power source is rapidly increasing. In particular, the electric vehicle market is growing by leaps and bounds, and research and development on lithium secondary batteries are actively carried out at home and abroad.

The lithium secondary battery typically includes among other elements a cathode, an anode, and a separator interposed therebetween, and active materials that lithium ions may be inserted and extracted are provided in the cathode and the anode, respectively.

On the other hand, with an increase in the need for large-capacity structures as well as applicability as an energy storage source, the demand for a plurality of secondary batteries that are electrically connected in series and/or parallel and battery modules having module housings that accommodate such secondary batteries therein is rising.

However, in prior battery modules, when a sudden temperature rise occurs due to thermal propagation of secondary battery cells, heat is not discharged, but rather heat can be propagated to adjacent cells, increasing the chance of a fire in the adjacent cells.

SUMMARY

Embodiments provide a novel type of cartridge for a secondary battery used as a power source for example in an eco-friendly vehicle such as an electric vehicle. The novel type of cartridge is designed in preparation for thermal propagation, and may be applied to a battery module, and a cartridge module.

In accordance with one aspect of the present disclosure, there is provided a cartridge for a secondary battery, including a cell accommodating case comprising a cooling plate and an outer frame formed along an outer edge of the cooling plate; and a coupling portion connected to the cell accommodating case and having a coupling hole through which a bolt, when inserted therethrough, passes in a direction in which the cell accommodating case is stacked, wherein the coupling portion may include a first communication hole formed in a direction different from the direction in which the bolt passes.

In accordance with another aspect of the present disclosure, there is provided a battery module including a cartridge comprising a cell accommodating case comprising a cooling plate and an outer frame formed along an outer edge of the cooling plate, and a coupling portion connected to the cell accommodating case and having a coupling hole through which a bolt, when inserted therethrough, passes in a direction in which the cell accommodating case is stacked; and one or more secondary battery cells accommodated in the cartridge, wherein the coupling portion may include a first communication hole formed in a direction different from the direction in which the bolt passes.

In accordance with another aspect of the present disclosure, there is provided a cartridge module including a battery module stack in which a plurality of the battery modules are stacked; and a bolt which connects the battery modules to each other, wherein the bolt may penetrate the coupling portion of each of the battery modules.

In accordance with another aspect of the present disclosure, there is provided a battery module including a plurality of cartridges, each cartridge comprising a cell accommodating case; a plurality of coupling portions, each coupling portion connected to an outer edge of the cell accommodating case and having a first communication hole open to the cartridge and a second communication hole open to an outside of the battery module; and a plurality of secondary battery cells accommodated in the plurality of cartridges along a stack direction, wherein the coupling portion may be configured to communicate gas generated inside the battery module by one or more of the secondary battery cells to the outside of the battery module by a gas communication path from the cartridge, into the first communication hole, and through the second communication hole.

BRIEF DESCRIPTION OF THE DRAWINGS

Various embodiments will now be described more fully hereinafter with reference to the accompanying drawings; however, these embodiments shown in the drawings may be embodied in different forms, and the present disclosure should not be construed as limited to the embodiments set forth herein. Rather, these embodiments are provided so that this disclosure will convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 8 is a diagram for illustrating a B-B' cross-section of FIG. 6.

DETAILED DESCRIPTION

The specific structural or functional description disclosed herein is merely illustrative for the purpose of describing embodiments according to the present disclosure. The embodiments described in the present disclosure can be implemented in various forms, and the present disclosure should not be construed as limited to the embodiments set forth herein.

Figure 1:
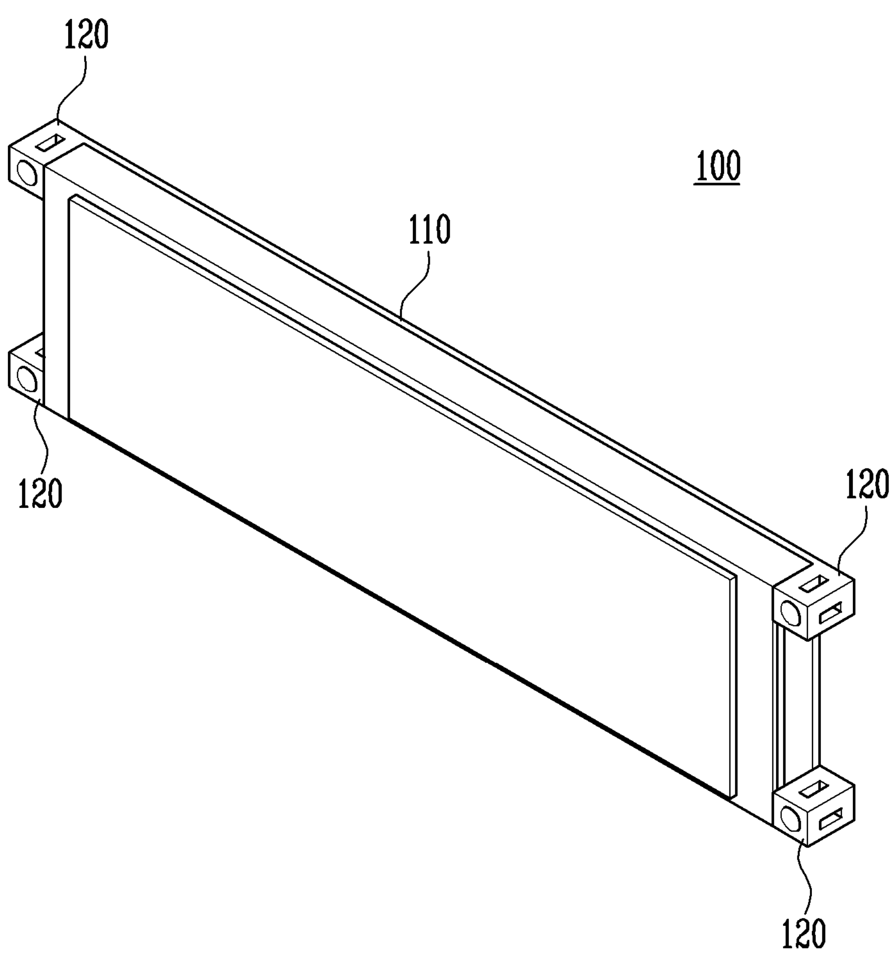
FIG. 1 is a diagram for illustrating a cartridge for a secondary battery in accordance with one embodiment of the present disclosure.

FIG. 1 is an exploded diagram for illustrating a cartridge for a secondary battery in accordance with one embodiment of the present disclosure.

Referring to FIG. 1, a cartridge 100 for a secondary battery may include a cell accommodating case 110 and a coupling portion 120.

The cell accommodating case 110 may be configured to accommodate one or more secondary battery cells therein. One or more secondary battery cells may be included in an accommodating portion that is an empty space formed by a cooling plate and an outer frame included in the cell accommodating case 110. In one embodiment of the present disclosure, the cartridge 100, the cell accommodating case 110, and the coupling portion 120 are eco-friendly components which can be used for example in an electric vehicle that is driven using a secondary battery or electricity as a power source, or in a hybrid vehicle that is driven using an engine and a secondary battery. Moreover, the cartridge 100, the cell accommodating case 110, and the coupling portion 120 reduce the chances of catastrophic destruction of such electric or hybrid vehicles from battery fires.

In FIG. 1, it is shown that the cell accommodating case 110 is in a cuboid shape, but is not limited thereto, and various shapes capable of accommodating the secondary battery cells therein may all be applied.

Figure 3:
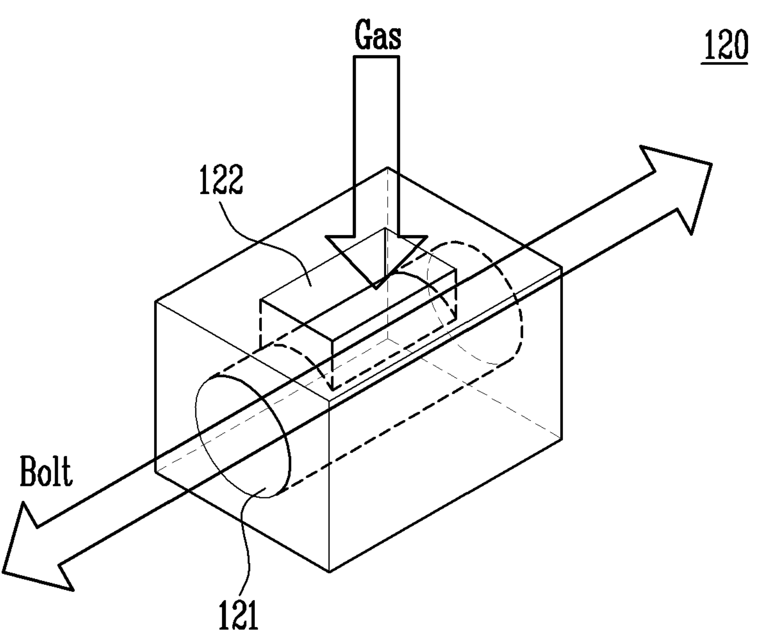
FIG. 3 is a diagram for illustrating a coupling portion included in a cartridge for a secondary battery in accordance with still another embodiment of the present disclosure.

The coupling portion 120 may be connected to the cell accommodating case 110. The coupling portion 120 may include a coupling hole (such as for example coupling hole 121 as shown in FIG. 3 below) through which a bolt may pass in a direction in which the cell accommodating case 110 is stacked. In FIG. 1, four coupling portions 120 are shown, but is not limited thereto, and an appropriate number of coupling portions 120 may be provided as necessary with respective coupling holes 121. In addition, in FIG. 1, it is shown that the coupling portion 120 is connected to an edge portion of the cell accommodating case 110, but the position of the coupling portion 120 is not limited thereto, and the coupling portion 120 may be positioned, without limitation, if the position is appropriate to be disposed for a coupling hole (such as for example coupling hole 121 in FIG. 3) through which a bolt (such as for example bolt 1300 in FIG. 8) may pass and a communication hole (such as for example communication hole 122 in FIG. 4) through which the inside of the cartridge 100 may communicate with the outside.

Figure 2:
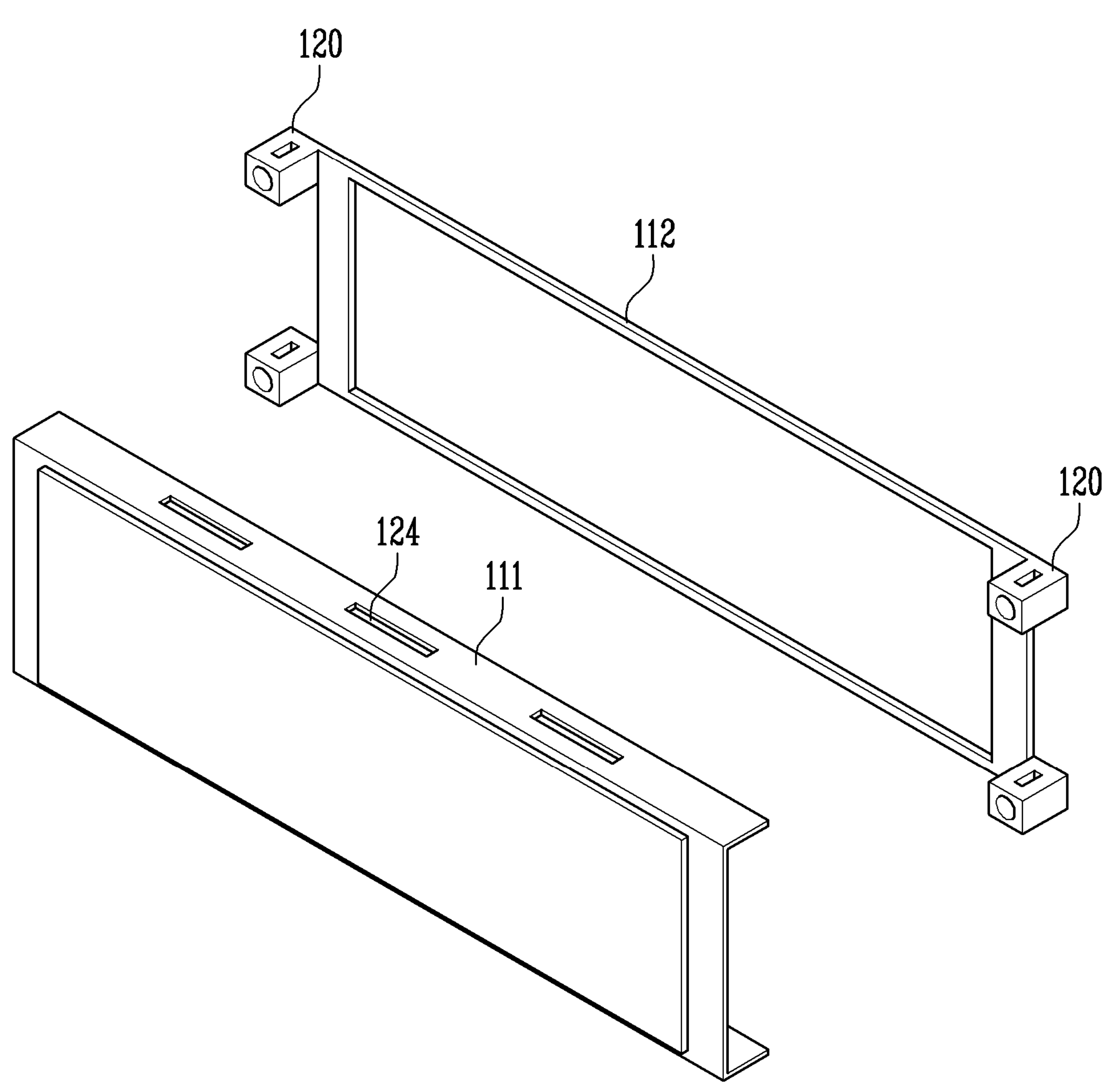
FIG. 2 is an exploded diagram for illustrating a cartridge for a secondary battery in accordance with another embodiment of the present disclosure.

FIG. 2 is an exploded diagram for illustrating the cartridge 100 for a secondary battery in accordance with one embodiment of the present disclosure.

Referring to FIGS. 1 and 2, the cell accommodating case 110 of cartridge 100 shown in FIG. 1 may include a cooling plate 111 and an outer frame 112. In FIG. 2, though it is shown that the outer frame 112 and the coupling portion 120 are integrated, in another embodiment, the coupling portion 120 may be integrated with the cooling plate 111, and in another embodiment, the coupling portion 120, as an individual component separated from both the cooling plate 111 and the outer frame 112, may be used by being combined to the cooling plate 111 and the outer frame 112.

In addition, in FIG. 2, it is shown that the cooling plate 111 is in a 'C' shape while the outer frame 112 is in a sheet shape with a central portion open, but the shape of each component is not limited thereto, and the cooling plate 111 and the outer frame 112 may have various shapes. In another embodiment, the cooling plate 111 may have a sheet shape, and the outer frame 112 may have a 'C' shape.

In one embodiment, the cell accommodating case 110 may include a communication hole 124. In one embodiment, the cell accommodating case 110 may include the communication hole 124 on a surface different from a part connected to the coupling portion 120. In FIG. 2, it is shown that the communication hole 124 is formed on the cooling plate 111, but is not limited thereto, and in another embodiment, the communication hole 124 may be formed on the outer frame 112.

FIG. 3 is a diagram for illustrating the coupling portion included in the cartridge 100 for a secondary battery in accordance with an embodiment of the present disclosure.

Referring to FIG. 3, the coupling portion 120 of cartridge 100 may include a coupling hole 121. The coupling hole 121 may be formed in the coupling portion 120 in a direction in which the plurality of cell accommodating cases are stacked, and the plurality of cell accommodating cases 110 may be connected to each other as a bolt passes through the coupling hole 121.

The coupling portion 120 may include a communication hole 122. The communication hole 122 may be formed in a direction different from the direction in which the bolt passes in the coupling portion 120. In one embodiment, the communication hole 122 may be configured to communicate with the inside of the cartridge 100 of coupling portion 120, that is, an accommodating portion of the cartridge 100 shown in FIG. 1. As the communication hole 122 is provided in the coupling portion 120 of cartridge 100 for a secondary battery, high-temperature gas generated from the secondary battery cell inside of cartridge 100 may move toward the coupling portion 120 through the communication hole 122.

In one embodiment, the coupling portion 120 may further include another communication hole (referenced below as a second communication hole 123) formed in a direction different from the direction in which the bolt passes and different from the direction in which the communication hole 122 is formed. This communication hole 123 may be configured to communicate with the outside of the cartridge. As such, by having a plurality of communication holes in a single coupling portion 120, high-temperature gas which may be generated inside the secondary battery cell may be discharged to the outside of the cartridge 100.

In addition, in one embodiment, in order to facilitate the discharge of gas generated from the secondary battery cells accommodated in the cartridge 100 for a secondary battery, the first communication hole 122 of the coupling portion 120 may be configured to communicate with the inside of cell accommodating case 110 as described below in reference to FIG. 4.

Figure 4:
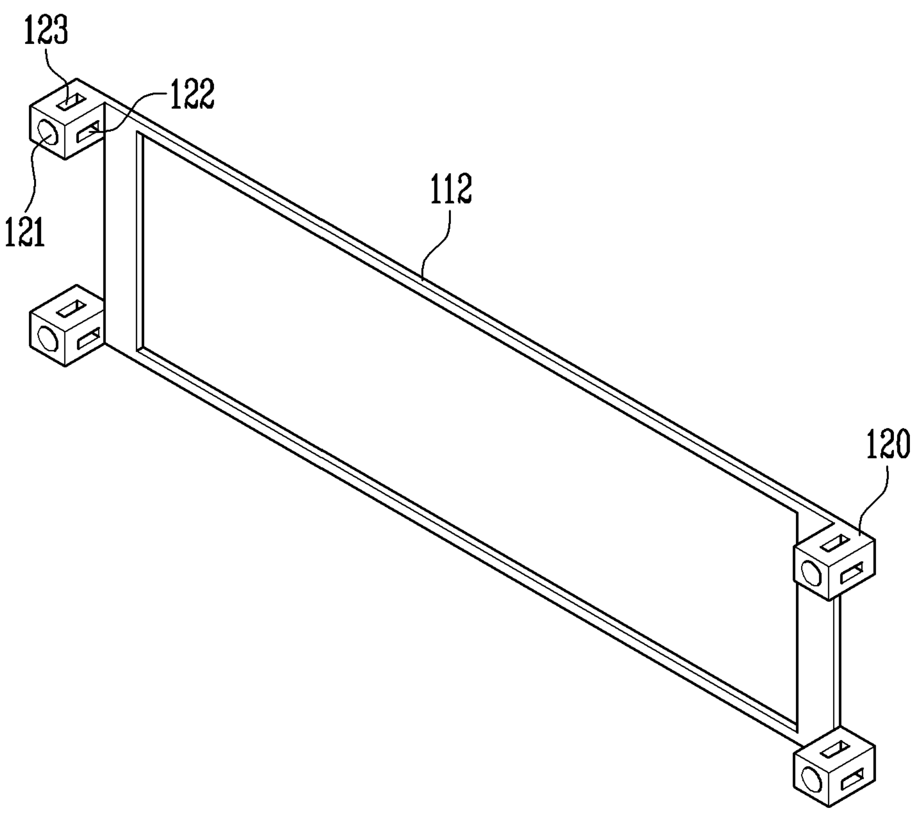
FIG. 4 is a diagram for illustrating an example of an outer frame included in a cartridge for a secondary battery in accordance with yet another embodiment of the present disclosure.

FIG. 4 is a diagram for illustrating an example of the outer frame included in the cartridge 100 for a secondary battery in accordance with another embodiment of the present disclosure.

The coupling portion 120 may include the coupling hole 121 through which the bolt may pass in a direction in which the plurality of cell accommodating cases 110 are stacked. In addition, the coupling portion 120 may include the first communication hole 122 formed in a direction different from the direction in which the bolt passes. Furthermore, the coupling portion 120 may include a second communication hole 123 formed in a direction different from the direction in which the bolt passes and different in the direction in which the first communication hole 122 is formed. Hereinafter, the communication hole 123 is referred to a second communication hole 123. The first communication hole 122 may be configured to communicate with the inside of the cartridge, and the second communication hole 123 may be configured to communicate with the outside of the cartridge.

In addition, the coupling portion 120 may further include additional first communication holes configured to communicate with the inside of the cartridge and additional second communication holes configured to communicate with the outside of the cartridge. Thereby, a discharge efficiency of high-temperature gas generated in the secondary battery cell inside the cartridge may be further increased.

In addition, whether the communication holes communicate with the inside of the cartridge or the outside of the cartridge may vary depending on the position of a busbar coupled to the cartridge later. This will be described in more detail in FIG. 6 below.

Figure 5:
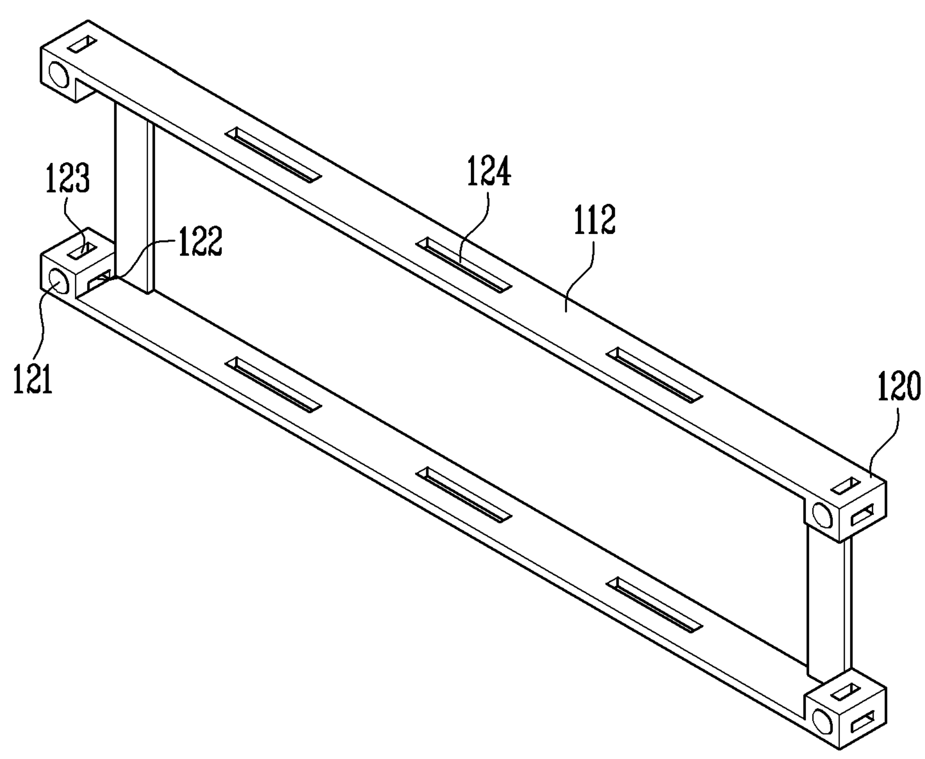
FIG. 5 is a diagram for illustrating an example of an outer frame included in a cartridge for a secondary battery in accordance with one embodiment of the present disclosure.

FIG. 5 is a diagram for illustrating an example of the outer frame included in the cartridge for a secondary battery in accordance with still another embodiment of the present disclosure.

Referring to FIG. 5, unlike the outer frame 112 shown in FIG. 4, the outer frame 112 in FIG. 5 may have a 'C' shape. In addition, the outer frame 112 may include the third communication hole 124 on a surface different from a part connected to the coupling portion 120.

In addition, the coupling portion 120 in FIG. 5 may include the coupling hole 121 through which the bolt may pass in a direction in which a plurality of cell accommodating cases are stacked. In addition, the coupling portion 120 may include the first communication hole 122 formed in a direction different from the direction in which the bolt passes. Furthermore, the coupling portion 120 may include the second communication hole 123 formed in a direction different from the direction through which the bolt passes and different from the direction in which the first communication hole 122 is formed.

Figure 6:
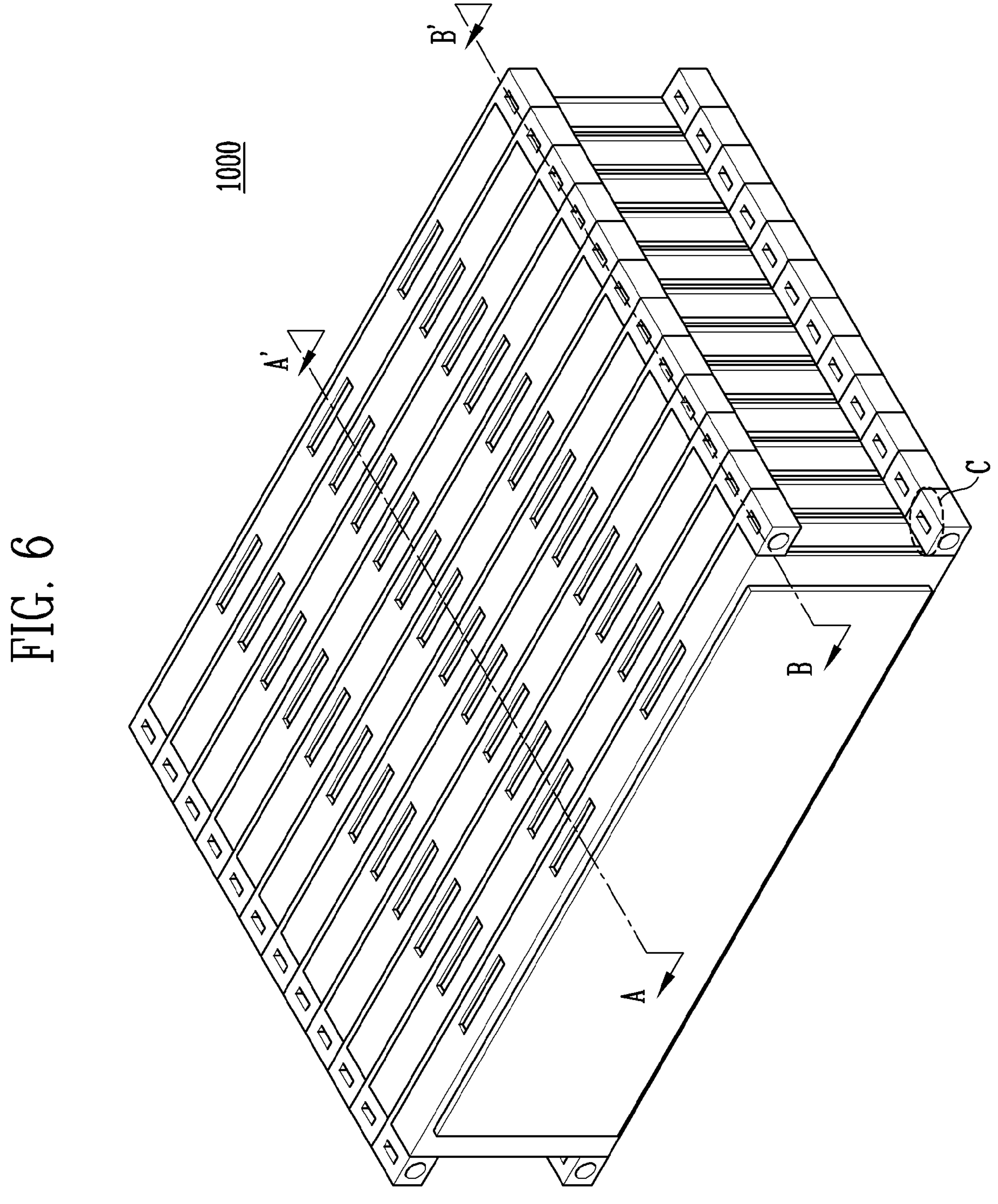
FIG. 6 is a diagram for illustrating a cartridge module in accordance with another embodiment of the present disclosure.

FIG. 6 is a diagram for illustrating a cartridge module in accordance with still another embodiment of the present disclosure.

Referring to FIG. 6, a cartridge module 1000 may be in a form in which the plurality of cartridges 100 for a secondary battery are stacked. At this time, one or more secondary battery cells may be accommodated in the cartridge 100 for a secondary battery, and the cartridge 100 for a secondary battery in which one or more secondary battery cells are accommodated may be referred to as a battery module.

Each of the cartridges 100 for a secondary battery may include one or more coupling portions 120, and the coupling holes 121 of each coupling portion may be aligned in a direction in which the cartridges for a secondary battery are stacked. Therefore, the coupling holes 121 of each coupling portion 120 may be connected to each other, and, as the bolt passes along the connected coupling holes 121, the plurality of cartridges 100 for a secondary battery may be connected to each other.

A busbar may be coupled to an end in a direction to which a cell tab of the cartridge module 1000 protrudes. Whether there are communication holes of the coupling portion 120 which communicate with the inside of the cartridge 100 or the outside of the cartridge 100 may be determined depending on the position of the busbar.

If a part of the busbar coupled to the cartridge module 1000 is positioned inside the cartridge then the coupling hole 121 represented by C in FIG. 6 may be configured to communicate with the outside of the cartridge 100 that is sealed by the busbar.

If a part of the busbar coupled to the cartridge module 1000 is positioned outside the cartridge 100 then the coupling hole 121 represented by C in FIG. 6 seals the coupling hole 121 represented by C, and the coupling hole 121 represented by C in FIG. 6 may be configured to communicate with the inside of the cartridge sealed by the busbar by way of first communication holes 121.

In addition, FIG. 6 shows that the plurality of cartridges all include the second communication hole 123 that is configured to communicate with the outside of the cartridge 100, but is not limited thereto, and it may be satisfied if at least one of the plurality of cartridges includes the second communication hole 123.

Thereby, the gas inside moved toward the coupling portion 120 through the first communication holes 122 that are configured to communicate with the inside of each of the plurality of cartridges 100 may move along the coupling holes 121 in the coupling portion 120, and the gas inside moving along the coupling holes 121 may also be discharged to the outside of the cartridge 100 through the second communication hole 123 included in at least one of the plurality of cartridges.

Figure 7:
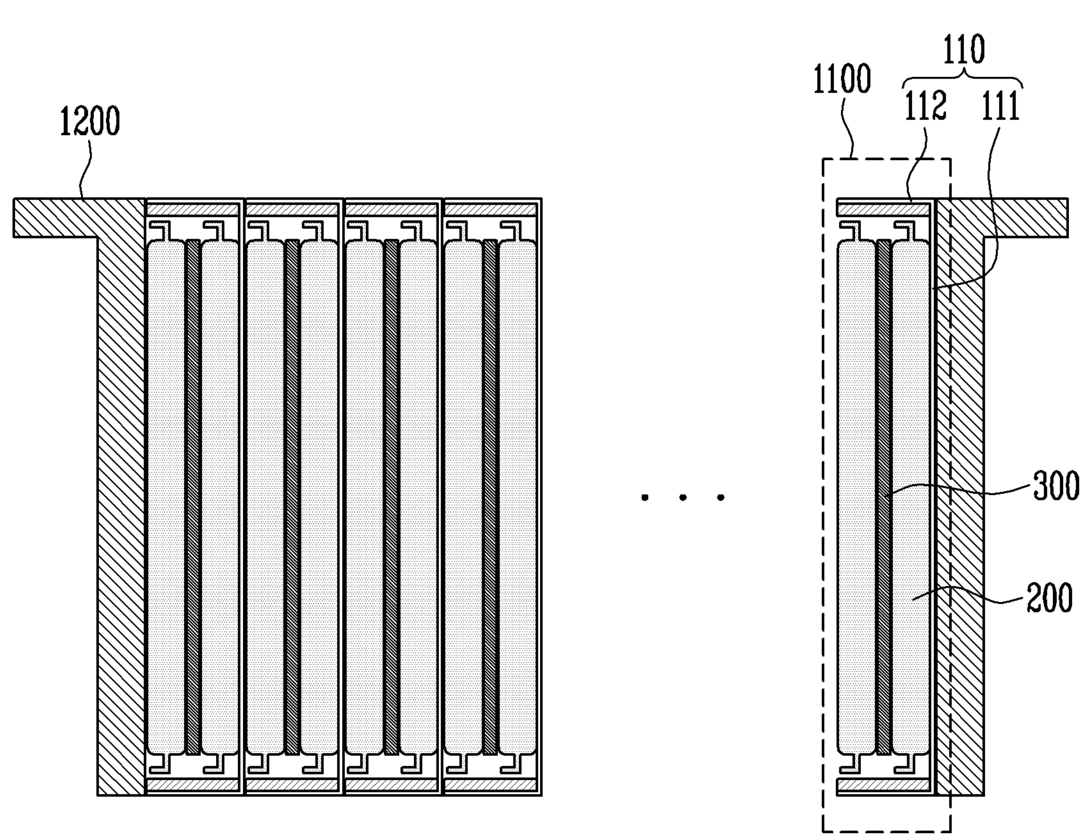
FIG. 7 is a diagram for illustrating an A-A' cross-section of FIG. 6.

FIG. 7 is a diagram for illustrating an A-A' cross-section of FIG. 6.

Referring to FIG. 7, the cartridge module 1000 may include a plurality of battery modules 1100 stacked along an A-A' direction of FIG. 6. The battery module 1100 may include the cell accommodating case 110 which includes the cooling plate 111 and the outer frame 112.

One or more secondary battery cells 200 may be accommodated in the cell accommodating case 110. The secondary battery cell 200 may include one or more electrode assemblies for a secondary battery. The electrode assembly for a secondary battery may include a plurality of anode plates, a plurality of cathode plates, and a separator.

The cathode plate and the anode plate may respectively include a current collector and an active material layer disposed on the current collector. For example, the cathode plate may include a cathode current collector and a cathode active material layer, and the anode plate may include an anode current collector and an anode active material layer.

The current collector may include a known conductive material that does not cause a chemical reaction in a lithium secondary battery. For example, the current collector may include one of stainless steel, nickel (Ni), aluminum (Al), titanium (Ti), copper (Cu), and alloys thereof, and may be provided in various forms such as a film, sheet, and foil.

The active material layer includes an active material. For example, the cathode active material layer may include a cathode active material, and the anode active material layer may include an anode active material.

The cathode active material may be a material that lithium (Li) ions may be inserted and extracted. The cathode active material may be lithium metal oxide. For example, the cathode active material may be at least one of lithium manganese-based oxides, lithium nickel-based oxides, lithium cobalt-based oxides, lithium nickel manganese-based oxides, lithium nickel cobalt manganese-based oxides, lithium nickel cobalt aluminum-based oxides, lithium iron phosphate-based compounds, lithium phosphate manganese-based compounds, lithium phosphate cobalt-based compounds, and lithium phosphate vanadium-based compounds, but is not necessarily limited to specific examples.

The anode active material may be a material that lithium ions may be adsorbed and extracted. For example, the anode active material may be one of carbon-based materials such as crystalline carbon, amorphous carbon, carbon composites, or carbon fibers, lithium alloy, silicon (Si), and tin (Sn). In accordance with one embodiment of the present disclosure, the anode active material may be natural graphite or artificial graphite, but is not limited to a specific example.

The cathode plate and the anode plate may further include a binder and a conductive material, respectively.

The binder may be configured to mediate the bonding between the current collector and the active material layer, thereby improving mechanical stability. In accordance with another embodiment, the binder may be an organic binder or a water-based binder and used with a thickener such as carboxymethyl cellulose (CMC). In accordance with still another embodiment, the organic binder may be one of vinylidene fluoride-hexafluoropropylene copolymer (PVDF-co-HFP), polyvinylidene fluoride (PVDF), polyacrylonitrile, and polymethylmethacrylate, and the water-based binder may be styrene-butadiene rubber (SBR), but are not necessarily limited thereto.

The conductive material may improve the electrical conductivity of lithium secondary batteries. The conductive material may include a metal-based material. In accordance with an embodiment, the conductive material may include a conventional carbon-based conductive material. For example, the conductive material may include one of graphite, carbon black, graphene, and carbon nanotubes. The conductive material may include carbon nanotubes.

In addition, the electrode assembly for a secondary battery may further include a cathode tab extending from the cathode plate and an anode tab extending from the anode plate. In one embodiment, the cathode tab and anode tab may protrude in a direction perpendicular to a direction that the separator is folded away from each of the cathode plate and anode plate, that is, in a longitudinal direction (x-axis direction). The cathode tab and anode tab may protrude in the same direction along a longitudinal direction or in an opposite direction along a longitudinal direction.

The separator may be disposed between the cathode plate and anode plate. The separator is configured to prevent electrical short circuits between the cathode plate and anode plate and generate a flow of ions.

In accordance with one embodiment, the separator may include a porous polymer film or a porous nonwoven fabric. Here, the porous polymer film may be formed in a single layer or multiple layers including polyolefin-based polymers such as ethylene polymers, propylene polymers, ethylene/butene copolymers, ethylene/hexene copolymers, and ethylene/methacrylate copolymers. The porous nonwoven fabric may include glass fibers with a high melting point and polyethylene terephthalate fibers. However, it is not limited thereto, and the separator may be a ceramic-containing high heat resistant separator (CCS; Ceramic Coated Separator) in accordance with an embodiment.

In addition, one or more compression pads 300 (as shown in FIG. 7) may be accommodated in the cell accommodating case 110. The compression pad 300 may be in contact with one surface of the secondary battery cell 200. The compression pad 300 may be configured to absorb a volume change due to a swirling phenomenon of the secondary battery cell 200. In one embodiment, the compression pads 300 may be disposed between the different secondary battery cells 200. In one embodiment, the compression pad 300 may include a polyurethane material, but is not limited thereto, and any material capable of absorbing a volume change by swirling of the secondary battery cell 200 may be applicable.

In the battery module 1100, an electrolyte provided along with the secondary battery cells 200 may be included. The electrolyte may be a non-aqueous electrolyte. The electrolyte may include lithium salts and organic solvents. In accordance with one embodiment, the organic solvent may include one of propylene carbonate (PC), ethylene carbonate (EC), diethyl carbonate (DEC), dimethyl carbonate (DMC), ethylmethyl carbonate (EMC), methylpropyl carbonate (MPC), dipropyl carbonate (DPC), vinylene carbonate (VC), dimethyl sulfoxide, acetonitrile, dimethoxyethane, diethoxyethane, sulfolane, gamma-butyrolactone, propylene sulfide, and tetrahydrofuran or a combination thereof.

In one embodiment, the secondary battery cell 200 may be a pouched type secondary battery or a can type secondary battery with a prismatic or circular shape, wherein, in the case of the pouched type secondary battery, it may be a pouched type secondary battery having a three-sided sealing structure or a pouched type secondary battery having a four-sided sealing structure, but it is not limited to a specific type of secondary battery.

For example, the secondary battery cell 200 may be configured in the pouched type secondary battery and may have a structure that an electrode lead protrudes to the outside. The secondary battery cell 200 may be configured in a form in which the electrode assembly is accommodated in a pouch. In this example, the electrode assembly has a plurality of electrode plates and electrode tabs, and the electrode assembly is accommodated in the pouch. Here, the electrode plate may include the cathode plate and the anode plate, and the electrode assembly may be configured in a form in which the cathode plate and the anode plate are stacked with the separator interposed therebetween while surfaces of the cathode plate and the anode plate face each other. The cathode plate and the anode plate may be formed as a structure in which an active material slurry is applied to the current collector, wherein the slurry may be formed by stirring a granular active material, auxiliary conductor, binder, and plasticizer, with a solvent added. In addition, in the electrode assembly, a plurality of cathode plates and a plurality of anode plates may be stacked for example in the left and right directions (or in the horizontal direction). In this case, electrode tabs may be provided in the plurality of cathode plates and the plurality of anode plates, respectively, and connected to the same electrode lead by coming in contact with each other with the same polarity. In the case of the secondary battery cell 200 in one embodiment, the two electrode leads may be disposed to face opposite directions from each other or may be disposed to face the same direction but at different heights.

In one embodiment, the pouch may be formed in the form of a container to provide an internal space in which the electrode assembly and the electrolyte are accommodated, wherein the electrode leads of the electrode assembly may be partially exposed to the outside of the pouch.

The pouch may be divided into an accommodating space and a sealing portion. The accommodating space may be formed in the form of a container to provide for example a square-shaped internal space. Inside the accommodating space, the electrode assembly and the electrolyte may be accommodated. The sealing portion may be a part to seal the circumference of the accommodating space as a part of the pouch is bonded. Therefore, the sealing portion may be formed in the form of a flange that extends to the outside from the accommodating space formed in the form of a container, and may be disposed along the outer edge of the accommodating space. A heat fusion method may be used for the bonding of the pouch for forming the sealing portion, but is not limited thereto.

In addition, in one embodiment, the sealing portion may be divided into a first sealing portion in which the electrode lead is disposed and a second sealing portion in which the electrode lead is not disposed.

In one embodiment, the pouch may be prepared by forming a sheet of exterior material. More specifically, after preparing one or two storages on a sheet of exterior material, the pouch may be completed by folding the exterior material so that the storages may form a space, that is, an accommodating space.

In one embodiment, the accommodating space may be formed for example into a rectangular shape. In addition, the outer edge of the accommodating space may be provided with the sealing portion that is formed by bonding the exterior material. However, there may be no need to form the sealing portion on a surface where the exterior material is folded. Therefore, in one embodiment, the sealing portion may be formed on the outer edge of the accommodating space, and provided only on three of the four surfaces of the accommodating space, and the sealing portion may not be disposed on any of the outer edges of the accommodating space.

In one embodiment, since the electrode leads can be disposed to face an opposite direction to each other, the two electrode leads may be disposed in the sealing portion formed on each different side, whereby the sealing portion may have two first sealing portions in which the electrode leads are disposed and may have one second sealing portion in which the electrode leads are not disposed. The second sealing portion may be formed on an upper or lower surface of the pouch.

In another embodiment, it is also possible to form the accommodating space by overlapping two sheets of exterior material and form the sealing portions on all four surfaces of the circumference of the accommodating space.

In one embodiment, the cartridge module 1000 may include end plates 1200 at both ends in a direction in which the battery modules 1100 are stacked.

Figure 8:
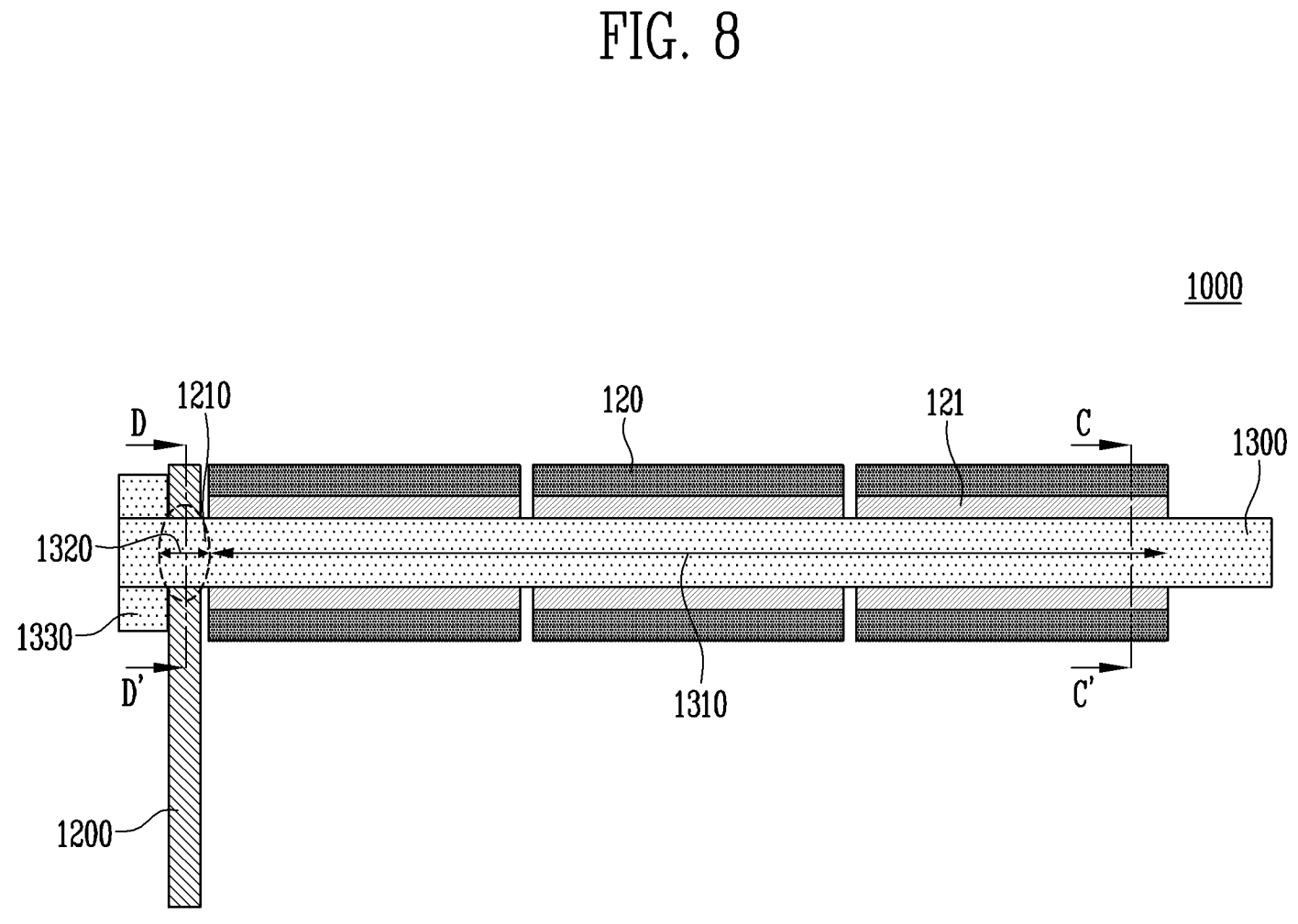

FIG. 8 is a diagram for illustrating a B-B' cross-section of FIG. 6.

Referring to FIG. 8, a bolt 1300 may pass through the coupling hole 121 formed in the coupling portion 120 on each of the plurality of battery modules.

In addition, the end plate 1200 may include a through hole 1210, and the bolt 1300 may pass through the through hole 1210 of the end plate 1200 to be inserted into the coupling hole 121 in each of the battery modules 1100.

Since the bolt 1300 must be inserted into the coupling hole 121, a diameter of a first portion 1310 of the bolt 1300 positioned in the coupling hole 121 is smaller in diameter than that of the coupling hole 121. At this time, the smaller the diameter of the first portion 1310 of the bolt 1300 than that of the coupling hole 121, the easier it may be to secure a path through which gas may be vented. Accordingly, gas in the battery module moves through an empty space inside the coupling hole 121 where the first portion 1310 of the bolt 1300 is positioned, and gas may be discharged through the communication hole 123 of the coupling portion 120 or may be discharged through the through hole 1210.

A difference between a diameter of a second portion 1320 of the bolt 1300 positioned in the through hole 1210 and that of the through hole 1210 of the end plate 1200 may be relatively small. Accordingly, even if there is a relatively large amount of empty space for securing a venting path of gas in the coupling hole where the first portion 1310 of the bolt 1300 is positioned, the empty space may barely exist inside the through hole 1210 where the second portion 1320 of the bolt 1300 is positioned. Therefore, the height of the bolt 1300 may be fixed without change in the coupling hole 121.

The bolt 1300 may include a fixing portion 1330 as shown in FIG. 8. The fixing portion 1330 may have a shape or dimension that blocks passage through the through hole 1210 from the outside of the end plate 1200, such that one end of the bolt 1300 may be fixed to the end plate 1200.

Figure 9A:
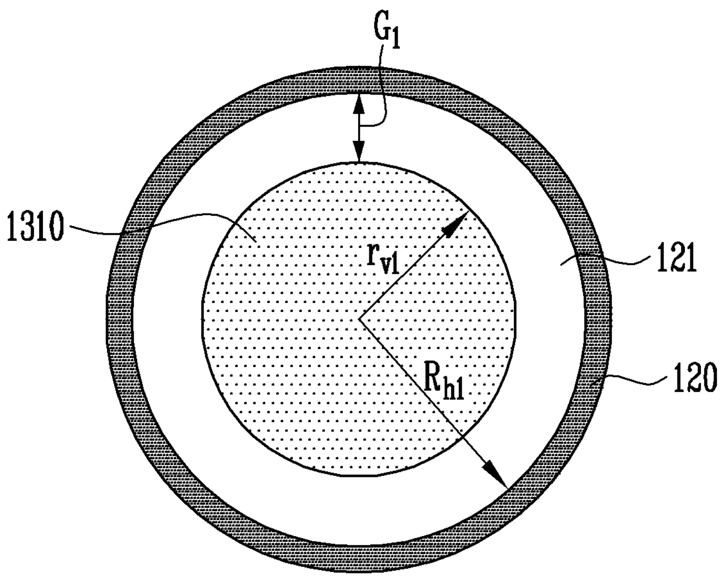
FIG. 9A is a diagram for illustrating a C-C' cross-section of FIG. 8.

FIG. 9A is a diagram for illustrating a C-C' cross-section of FIG. 8.

Figure 9B:
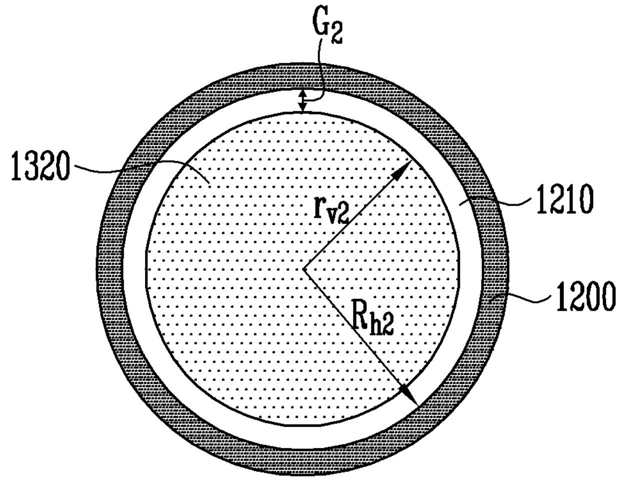
FIG. 9B is a diagram for illustrating a D-D' cross-section of FIG. 8.

FIG. 9B is a diagram for illustrating a D-D' cross-section of FIG. 8.

Referring to FIGS. 8, 9A and 9B, it may be noticed that the cross-sectional sizes of empty spaces in the coupling hole 121 and the through hole 1210 in which the first portion 1310 and the second portion 1320 of the bolt are positioned respectively are different from each other.

First, referring to FIG. 9A, there is an empty space identified by gap $G_1$ having a cross-section with a relatively large area in the coupling hole 121 in which the first portion 1310 of the bolt is positioned.

On the other hand, referring to FIG. 9B, there is only a very small empty space identified by gap $G_2$ in the through hole 1210 in which the second portion 1320 of the bolt is positioned.

That is, a difference G1 between a diameter Rh1 of the coupling hole 121 and a diameter rv1 of the first portion 1310 of the bolt in FIG. 9A may be greater than a difference G2 between a diameter Rh2 of the through hole 1210 and a diameter rv2 of the second portion 1320 of the bolt in FIG. 9B. Accordingly, it is possible to secure a gas venting path in the coupling portion 120, while the bolt that is configured to connect the plurality of battery modules may be stably fixed.

In the case of FIG. 8, it is evident that a diameter rv1 of the first portion 1310 and a diameter rv2 of the second portion 1320 of the bolt are the same or approximately the same, and a diameter Rh1 of the coupling hole 121 is greater than a diameter Rh2 of the through hole 1210, but is not limited thereto. In another embodiment, a diameter Rh1 of the coupling hole 121 and a diameter Rh2 of the through hole 1210 are the same or approximately the same, and a diameter rv1 of the first portion 1310 of the bolt may be smaller than a diameter rv2 of the second portion 1320.

While the present disclosure has been shown and described with reference to the disclosed embodiments thereof, it will be understood that various changes in form and details may be made therein without departing from the scope of the present disclosure and their equivalents.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, those skilled in the art will recognize that various modifications to the embodiments disclosed are within the technological scope of the present disclosure.

Moreover, the embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. Those skilled in the art will recognize that various modifications to the embodiments disclosed are within the technological scope of the present disclosure in addition to the embodiments disclosed herein. Furthermore, the embodiments can be combined to form additional embodiments.

What is claimed is:

1. A cartridge for a secondary battery, the cartridge comprising:

a cell accommodating case comprising a cooling plate and an outer frame formed along an outer edge of the cooling plate; and a coupling portion connected to the cell accommodating case and having a coupling hole through which a bolt, when inserted therethrough, passes in a direction in which the cell accommodating case is stacked, wherein the coupling portion comprises a first communication hole formed in a direction different from the direction in which the bolt passes, wherein the first communication hole is configured to communicate with a hole formed on an outer surface of the coupling portion.

2. The cartridge of claim 1, wherein the cell accommodating case further comprises an accommodating portion which is configured to accommodate one or more secondary battery cells therein.

3. The cartridge of claim 2, wherein the first communication hole is configured to communicate with the accommodating portion.

4. The cartridge of claim 3, wherein the coupling portion further comprises a second communication hole formed in a direction different from the direction in which the bolt passes and different from the direction in which the first communication hole is formed.

5. The cartridge of claim 4, wherein the second communication hole is configured to communicate with an outside of the cartridge.

6. The cartridge of claim 1, wherein a diameter of the coupling hole is greater than that of the bolt.

7. The cartridge of claim 1, wherein the cell accommodating case comprises a third communication hole on a surface different from a part connected to the coupling portion.

8. A battery module comprising:

a cartridge comprising a cell accommodating case comprising a cooling plate and an outer frame formed along an outer edge of the cooling plate, and a coupling portion connected to the cell accommodating case and having a coupling hole through which a bolt, when inserted therethrough, passes in a direction in which the cell accommodating case is stacked; and one or more secondary battery cells accommodated in the cartridge, wherein the coupling portion comprises a first communication hole formed in a direction different from the direction in which the bolt passes, wherein the first communication hole is configured to communicate with a hole formed on an outer surface of the coupling portion.

9. The battery module of claim 8, further comprising one or more compression pads accommodated in the cartridge.

10. The battery module of claim 9, wherein the compression pads are disposed between the different secondary battery cells.

11. A cartridge module comprising:

a battery module stack in which a plurality of the battery modules of claim 8 are stacked; and a bolt which connects the battery modules to each other, wherein the bolt penetrates the coupling portion of each of the battery modules.

12. The cartridge module of claim 11, further comprising end plates at both ends in a direction in which the battery modules are stacked.

13. The cartridge module of claim 12, wherein at least one of the end plates comprises a through hole through which the bolt, when inserted therethrough, passes.

14. The cartridge module of claim 13, wherein a difference between a diameter of the coupling hole and that of a second portion of the bolt positioned in the coupling hole is greater than a difference between a diameter of the through hole and that of the second portion of the bolt positioned in the through hole.

15. The cartridge module of claim 12, wherein the bolt comprises a fixing portion that is configured to be fixed to at least one of the end plates.

16. The cartridge module of claim 11, wherein the cartridge of at least one of the battery modules further comprises, in the coupling portion, a second communication hole which is formed in a direction different from the direction in which the bolt passes and the direction in which the first communication hole is formed.

17. The cartridge module of claim 16, wherein the second communication hole is configured to communicate with an outside of the cartridge module.

* * * * *